May 13, 1924.

J. A. McCASKELL

FILTER

Filed June 20, 1923  3 Sheets-Sheet 1

1,494,122

Jasper A. McCaskell
INVENTOR

BY
Moses, Hammond & Nolte
ATTORNEYS

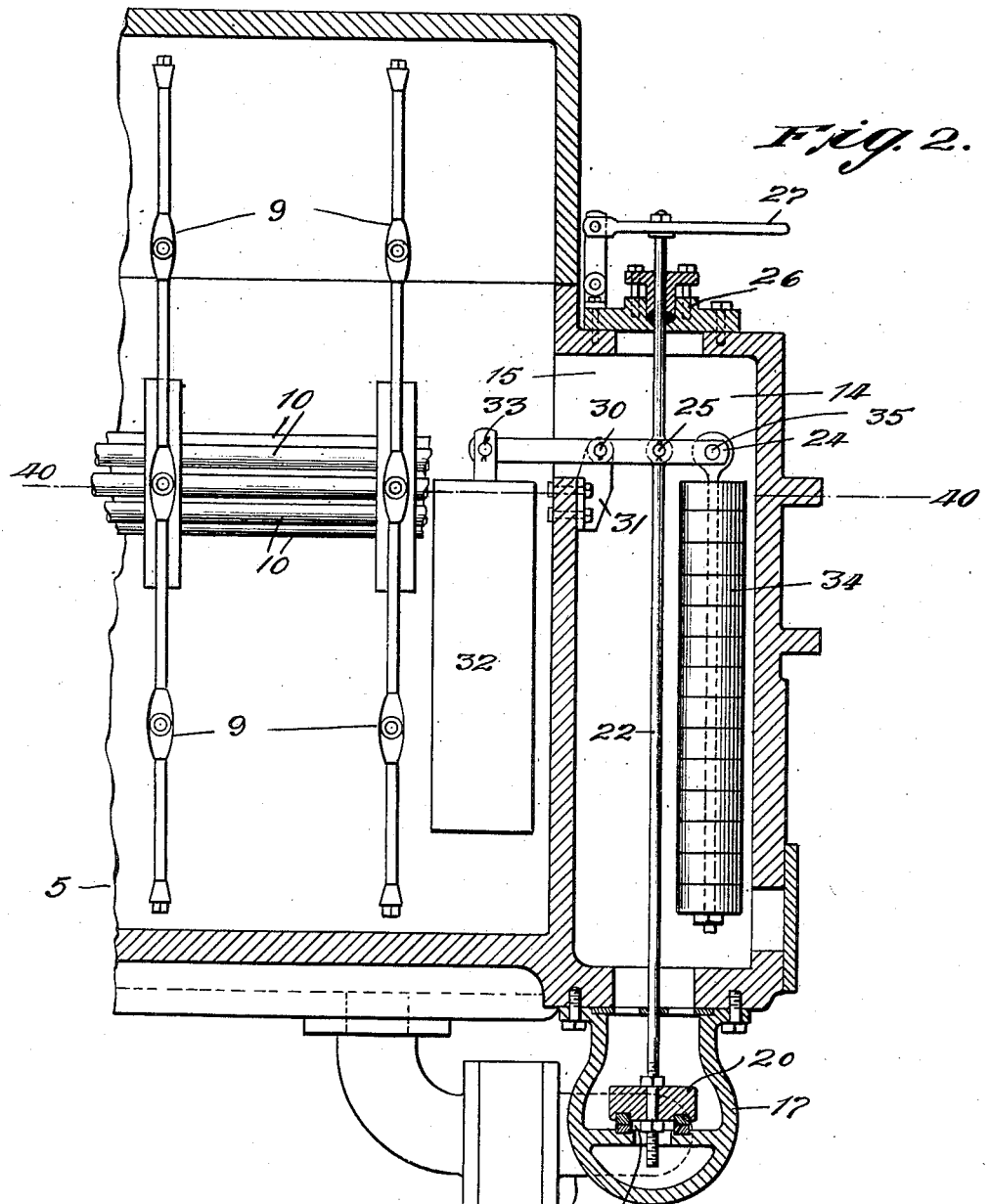

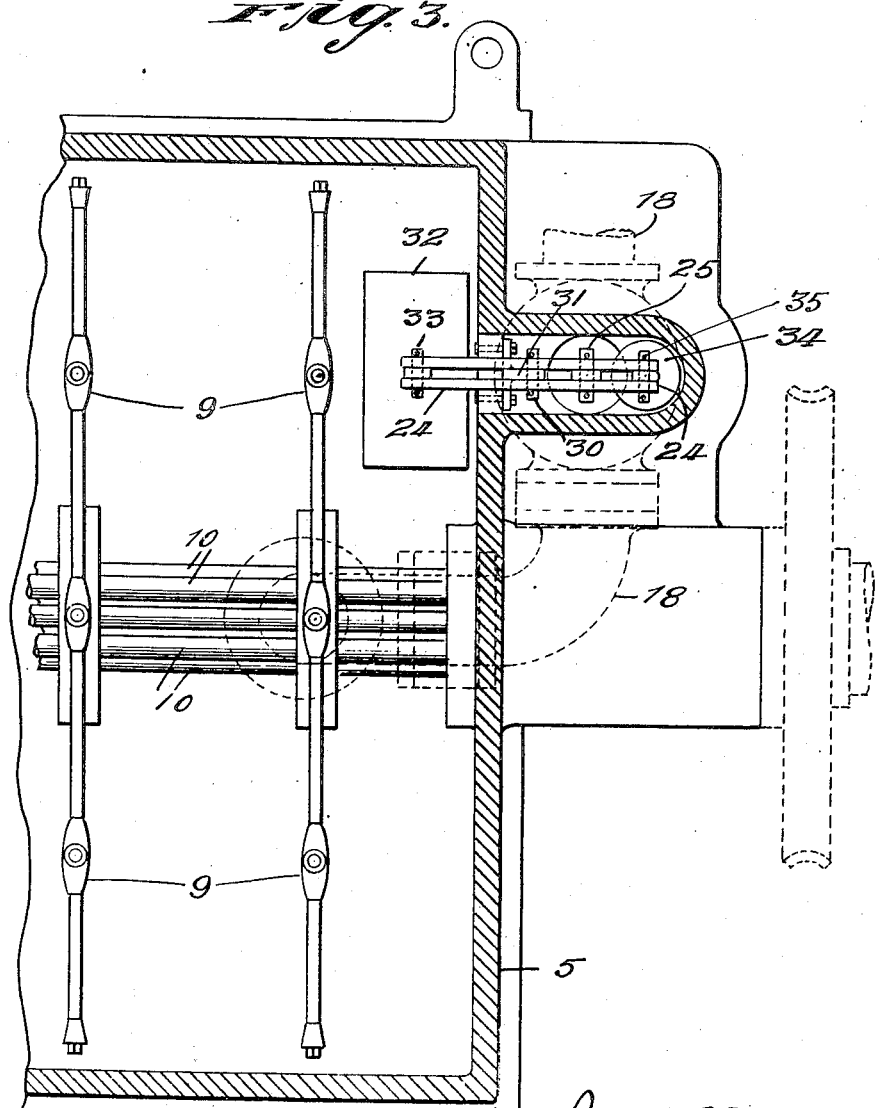

Patented May 13, 1924.

1,494,122

UNITED STATES PATENT OFFICE.

JASPER A. McCASKELL, OF SALT LAKE CITY, UTAH.

FILTER.

Application filed June 20, 1923. Serial No. 646,695.

*To all whom it may concern:*

Be it known that I, JASPER A. McCASKELL, a citizen of the United States, residing in Salt Lake City, county of Salt Lake, and State of Utah, have invented certain new and useful Improvements in Filters, of which the following is a specification.

This invention relates to filters and more especially to an improved means for automatically controlling the level of the liquid to be filtered in filters of the rotary pressure type.

My invention is especially adapted for use with pressure filters of the types described in Patents No. 1,266,133 and No. 1,288,433. Such pressure filters of necessity employ closed casings and the difficulty of accurately controlling manually the level of the solution being filtered can be appreciated. Various mechanisms have been tried for automatically controlling this level but such mechanisms have not proven equal to the destructive conditions existing in chemical plants; nor have they maintained an unvarying solution level.

The output of a filter varies with the submerged area of filtering surface, and if a part of that surface is not submerged and remains unemployed, the loss becomes considerable, because the unsubmerged area permits free passage of the gas or air which is supplied to the filter casing under pressure, thereby causing wide differences in the pressure under which the filter operates and affecting injuriously the operation of the whole apparatus.

It is the general object of my invention to provide simple and effective means whereby the feed of the solution which is to be filtered will be automatically controlled thus eliminating the necessity for careful attention on the part of the filter operator, heretofore necessary, and to provide means whereby the level of the aforementioned solution may be controlled with a degree of accuracy not heretofore possible.

The description and drawings which form a further part of this specification will serve to disclose one preferred embodiment of my invention.

Like numerals have been employed to indicate like parts throughout the description and the drawings.

Fig. 2 shows to enlarged scale and in partial vertical section the filter and attached device shown in Fig. 1.

Fig. 3 is a plan view of the preferred embodiment with the filter taken in horizontal section on its center-line.

Figure 1:
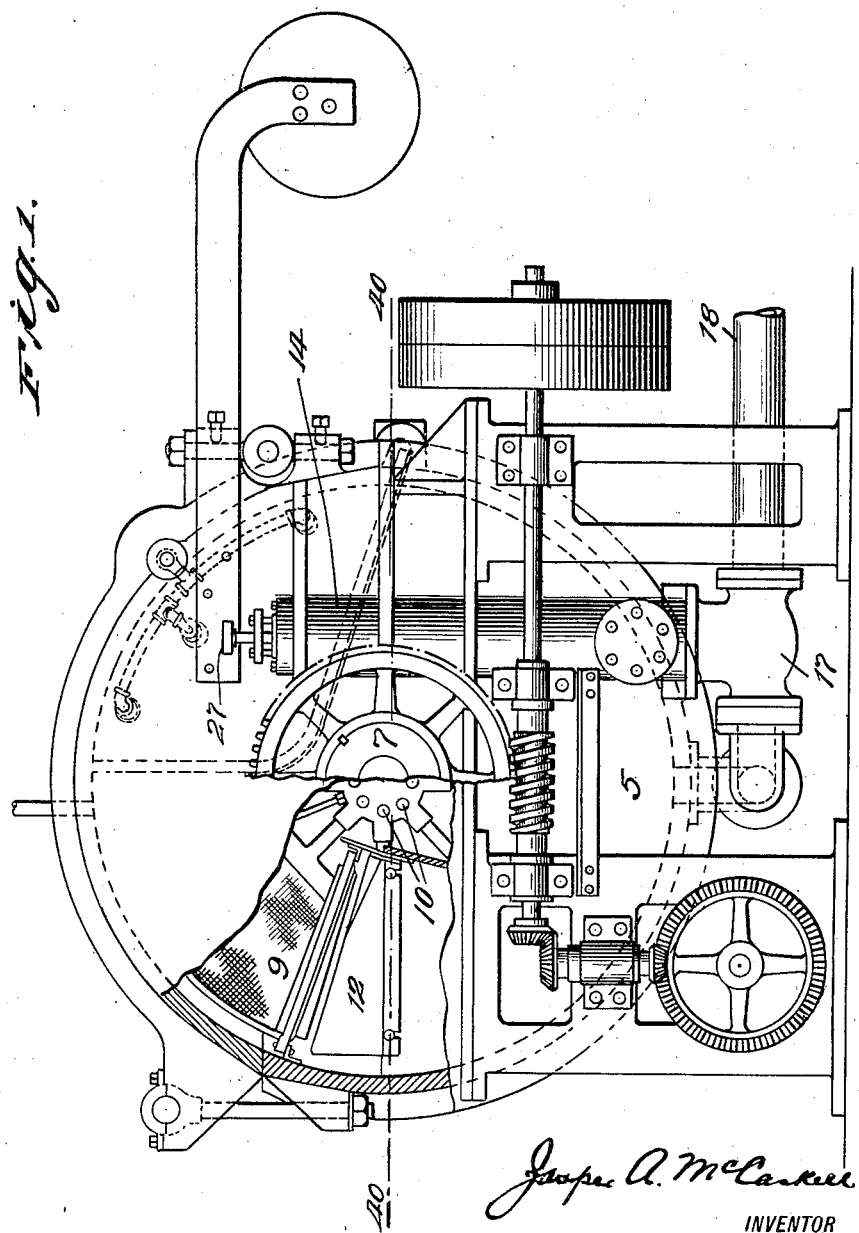
Fig. 1 illustrates in end elevation a pressure filter having part of its casing broken away and with one embodiment of my invention attached.

The pressure filter shown in Fig. 1, comprises a pressure tight casing shell 5, provided with a central shaft 7, supporting the filter elements 9. The filter elements 9 are constructed of hollow foraminous material and their interiors communicate with the shaft passages 10 which afford the filtrate discharge. Passages 10 are controlled by a suitable valve which closes them off during the time that the elements 9 are above the level of the solution contained in the casing shell 5. The casing shell is preferably maintained under pressure, the space above the solution being filled with air, or gas, at pressures considerably above that in the passages 10. Since these passages 10 must be of restricted dimensions, it will be appreciated that, if even a small portion of the foraminous surface of elements 9 be exposed above the solution level, the gas will rush through and choke the passages 10 thus reducing the pressure difference so seriously that filtration will almost stop.

If the level of the solution in the casing shell 5 rise too high it will flood and render ineffective the cake removal means 12, again, but in a different manner, reducing effective filtration seriously.

The importance of controlling the solution level between such limits that neither of preceeding conditions ever arise will be plain and to accomplish such control I have provided a chamber 14 attached to the casing shell 5, and communicating freely therewith through the opening 15. The lower end of chamber 14 communicates with the side of a valve 17 in the solution feed line 18, which communicates with the inside of the filter casing. Valve 17 is provided with a seat 19 and a disc 20. It will be understood that many other types of valve are equally as applicable to my purpose, the disc valve being shown for illustrative purposes only. Disc 20 is attached to a valve stem 22, which passes upward through chamber 14 and between the two halves of the double lever 24 to which the stem is attached by such means as the pin 25. Stem 22 may also be continued upward as shown in Fig. 2, through a stuffing box 26 to a lever 27 which affords manual control when desired.

The double lever 24 fulcrums upon pin 30 of bracket 31 attached to the filter casing. This lever 24 is attached also to a float 32, in the filter shell 5, through a pin 33, and to a counter-weight 34 arranged in chamber 14, by means of a fourth pin 35.

Float 32 is a displacement member rather than a float in that it is of higher specific gravity than the liquid to be filtered and is preferably constructed of sheet metal filled with concrete; it is, however, substantially heavier, although of less specific gravity, than the counter-weight 34 which may be constructed of cast iron. The lever 24 forms means for balancing the weight of float 32 against the weight of counter-weight 34, both of which extend downwardly into the liquid to be filtered.

It should be noted that float 32 and the entire operating mechanism is of heavy, rugged construction adapted to withstand chemical and mechanical abuse of the worst kind.

In operation, the solution which is to be filtered is supplied through the feed pipe 18. If the solution in filter casing shell 5 is below a predetermined level, such as line 40, the excess weight of float 32 over counter-weight 34 holds the lever 24 tilted, and the disc 20 raised from its seat 19, and the solution is thus fed freely to the filter. As the level of the solution rises, however, the effective weight of the float 32 decreases at a faster rate than does the effective weight of the counter-weight 34, with the result that when the level of the liquid reaches about the height of the line 40, the effective weight of the counter-weight 34 exceeds the effective weight of the float 32 sufficiently to cause downward movement on the end of the lever to which the valve stem 22 is attached, thereby closing the valve 17 and cutting off the flow of solution through the feed pipe 18. In actual practice, however, the level of the solution seldom rises far enough above line 40 to cause complete valve closure nor does it drop low enough to fully open the valve, and the valve 17 assumes an opening large enough to pass the solution as it is filtered and only shifts slightly from time to time as the rate of filtration or supply pressure varies. The weight of float 32 and counter-weight 34 together with the arrangement of the counter-weight in the chamber 14, which is also filled with solution, tends to prevent sudden valve movements and smooths out the smaller irregularities in feed pressure and in solution level. This becomes especially important in filters employing agitating means to maintain a solution of even density, and the float 32 is of such weight that currents and eddys caused by the motion of the filter elements, or by agitation do not disturb it, while all of the parts are of such strength that only abnormal conditions of considerable violence can affect them in any way.

Lever 27, provides a convenient indication of the operation of the valve and affords manual means for flushing the valve 17 and feed pipe 18, or for altering the solution level in the casing temporarily.

Thus, it will be seen that by employing means of great simplicity adapted to meet the extremely trying conditions under which they must operate, a device capable of reducing labor and of increasing efficiency of operation has been provided without involving any considerable expense or difficult modifications in the forms of filter which have been found most satisfactory.

It will be manifest to those skilled in the art that many changes and modifications may be made in the elements and in their arrangement without departing from the scope of the following claims, and it will also be seen that certain parts and elements may be used to accomplish beneficial results without the use of certain other parts and without departing from the spirit of my invention.

What I claim is:

1. In a filter, a filter casing, a filter element mounted therein, a feed pipe communicating with said casing, a valve controlling the flow of liquid to be filtered through said pipe, a float in said casing, a lever to which said float is attached, a counter-weight attached to said lever upon the side of the fulcrum opposite the side at which the float is attached, and a valve operating member attached to said lever, said float being substantially heavier than said counter-weight.

2. In a filter, a casing, a filter element revolvably mounted therein, a feed pipe through which the solution to be filtered passes to said casing, a valve in said feed pipe, and means for controlling said valve so as to maintain a substantially constant level of the solution within the casing comprising a movable valve member, a lever connected thereto, a float having a specific gravity substantially higher than the specific gravity of the liquid to be filtered attached to said lever on one side of its fulcrum and extending into the liquid within the casing, and a counter-weight having a weight substantially less than the weight of said float attached to said lever on the other side of its fulcrum point.

3. In a filter, a filter casing, a filter element therein, a feed pipe communicating with said casing, a valve controlling the flow through said pipe of the liquid to be filtered, and means for controlling said valve so as to maintain a substantially constant level of the solution in the casing comprising a float having a specific gravity substantially higher than the specific gravity of the liquid to be filtered, a lever to which said float is attached, a counter-weight attached to said lever upon the side of the fulcrum opposite to the side on which the float is attached, said counter-weight having a weight substantially less than the weight of said float, and an operating connection between said lever and said valve.

4. In a filter, a casing, a filter element revolvably mounted therein, a feed pipe through which the solution to be filtered passes to said casing, a valve in said feed pipe, a chamber attached to said casing and in communication therewith, a float in said casing, a counter-weight in said chamber, a lever to opposite ends of which said float and counter-weight are attached, said float having a weight substantially greater than the weight of said counter-weight, and an operative connection between said lever and said valve.

5. In a filter, a filter casing, a filter element mounted therein, a feed pipe through which the solution to be filtered passes through said casing, a valve in said feed pipe, and means for controlling said valve so as to maintain a substantially constant level of the solution in the casing comprising a float and a counter-weight suspended from opposite ends of a lever, said float having a specific gravity higher than the specific gravity of the liquid to be filtered but lower than the specific gravity of the counter-weight, and an operating connection between said lever and said valve whereby said valve will be opened when the effective weight of the float in the liquid is greater than the effective weight of the counter-weight and will be closed when the effective weight of the float is less than the effective weight of the counter-weight.

In testimony whereof I have affixed my signature to this specification.

JASPER A. McCASKELL.